(12) United States Patent
Higashiya (10) Patent No.: US 7,609,476 B2
(45) Date of Patent: Oct. 27, 2009

(54) MAGNETIC DISK DRIVE WITH ISOLATION WALL

(75) Inventor: Teruyoshi Higashiya, Kanagawa (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 378 days.

(21) Appl. No.: 11/403,434

(22) Filed: Apr. 12, 2006

(65) Prior Publication Data

US 2006/0227453 A1    Oct. 12, 2006

(30) Foreign Application Priority Data

Apr. 12, 2005    (JP) .............................. 2005-114895

(51) Int. Cl.
 *G11B 33/12*   (2006.01)
 *G11B 5/55*    (2006.01)
(52) U.S. Cl. ............... 360/97.01; 360/264.3; 360/264.9
(58) Field of Classification Search ............. 360/97.01, 360/98.01, 264.3, 264.7, 264.9
See application file for complete search history.

(56) References Cited

U.S. PATENT DOCUMENTS 5,172,287 A * 12/1992 Ishida ..................... 360/264.3
5,193,037 A *  3/1993 Pace ........................ 360/264.8
5,235,481 A *  8/1993 Kamo et al. ............. 360/97.01
5,247,410 A *  9/1993 Ebihara et al. ........... 360/264.9

FOREIGN PATENT DOCUMENTS

JP      07-320478      8/1995
JP      10-340568     12/1998

\* cited by examiner

*Primary Examiner*—Jefferson Evans
(74) *Attorney, Agent, or Firm*—Townsend and Townsend and Crew LLP; John Henkhaus (57) ABSTRACT

Embodiments of the invention provide a magnetic disk drive whose flexibility in the layout of components is enhanced in spite of the fact that a magnetic disk and a driving section such as the voice coil motor that drives a head arm are isolated from each other. In one embodiment, a magnetic disk drive includes a magnetic disk compartment in which a magnetic disk, a head that reads/writes data from/onto the magnetic disk, and a head arm holding the head are disposed, and a VCM compartment with an internally disposed VCM that pivotally moves the head arm about a pivot shaft. The magnetic disk compartment and the VCM compartment are separated by an isolation wall provided at the bottom of the magnetic disk compartment along the recording surface of the magnetic disk. The pivot shaft is disposed in a penetrating form in an opening.

20 Claims, 6 Drawing Sheets

MAGNETIC DISK DRIVE WITH ISOLATION WALL

CROSS-REFERENCES TO RELATED APPLICATIONS

This application claims priority from Japanese Patent Application No. JP2005-114895, filed Apr. 12, 2005, the entire disclosure of which is incorporated herein by reference.

BACKGROUND OF THE INVENTION

The present invention relates to a magnetic disk drive having a magnetic disk isolated from a driving section such as the voice coil motor which drives a head arm.

The magnetic disk used as a recording medium in a magnetic disk drive has a plurality of concentrically formed tracks, each of which is divided into a plurality of sectors. Sector address information and user data are stored into each sector. A head can write data into or read it out from desired sectors by accessing the sectors in accordance with address information thereof. The signals that the head has read out from the magnetic disk during data reading are subjected to waveform shaping, decoding, and other required signal processing, by the signal-processing circuit provided on the circuit board of the magnetic disk drive, and then transmitted to a host. As with the above signals, data that has been transferred from the host is subjected to required processing and then written onto the magnetic disk.

The above-mentioned head is fixed to a slider and installed at the front end of a head arm via a suspension. The driving force of a voice coil motor (VCM) operates the head arm, thus moving the head.

Such a magnetic disk drive has the problem in that the dust stemming from the internal VCM of the driving mechanism for the head arm, and from components such as the bearing used to fix the head arm, reduces the cleanliness of the enclosure interior of the magnetic disk drive.

Accordingly, there is known a technique for preventing the flow of dust from the VCM into the disk compartment containing the magnetic disk, by isolating the VCM from the disk compartment. Patent Reference 1 (Japanese Patent Laid-Open No. 7-320478), for example, discloses a construction that isolates a magnetic disk from a VCM via the upstream isolation wall and downstream isolation wall provided along the outer circumference of the magnetic disk, and via the pivot shaft of a head arm.

Figure 6:
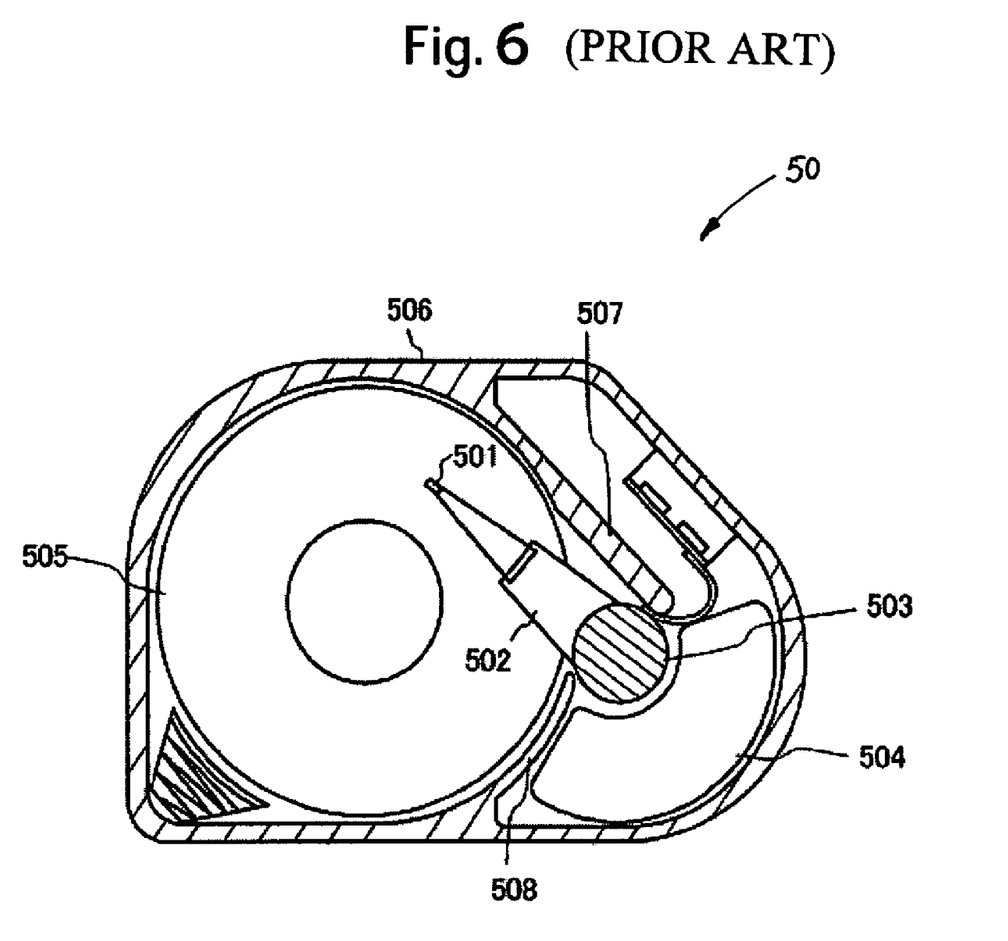
FIG. 6 is a view of a conventional magnetic disk drive.

FIG. 6 is a plan view of the magnetic disk drive 50 disclosed in Patent Reference 1, with a top cover removed. A slider 501 is installed at the front end of a head arm 502, which is supported by an arm pivot shaft 503. The driving force of VCM 504 pivotally moves the head arm 502 about the arm pivot shaft 503. As shown, the VCM 504 and magnetic disk 505 are isolated from each other by the upstream isolation wall 507 and downstream isolation wall 508 that an enclosure 506 has, and by the arm pivot shaft 503. This construction prevents the dust stemming from the VCM 504, from entering the disk compartment in which the magnetic disk 505 is installed.

BRIEF SUMMARY OF THE INVENTION

The magnetic disk drive 50 disclosed in Patent Reference 1 isolates the VCM 504 from the magnetic disk 505 by having isolation walls along the outer circumference of the magnetic disk 505. Accordingly, the VCM 504 is positioned externally to the outer circumference of the magnetic disk 505. It is therefore difficult to reduce the installation surface area required for the installation of the magnetic disk drive 50.

In addition, the construction of the magnetic disk drive 50 disclosed in Patent Reference 1 cannot be applied to magnetic disk drives of the load/unload (LUL) scheme which unloads a slider from a magnetic disk when the disk stops rotating. The inapplicability is due to the fact that the presence of isolation walls in the magnetic disk drive 50 limits the operating zone of its head arm and does not permit slider unloading from the magnetic disk surface.

For these reasons, the conventional type of magnetic disk drive in which the magnetic disk and the driving section for the head arm, such as the VCM, are isolated from each other also has the problem of low flexibility in the layout of components.

The present invention has been made for solving the above problems, and a feature of the invention is to provide a magnetic disk drive whose flexibility in the layout of components is enhanced despite isolation between a magnetic disk and a driving section such as the voice coil motor which drives a head arm.

A magnetic disk drive according to the present invention includes a first compartment in which a magnetic disk, a head that conducts at least either of data reading and writing operations on said magnetic disk, and a head arm holding said head are disposed, and a second compartment with an internally disposed driving section that pivotally moves said head arm about a pivot shaft. The first compartment and the second compartment are separated by an isolation wall provided along a recording surface of said magnetic disk, and said pivot shaft is disposed in a penetrating form in an opening that the isolation wall has.

This construction makes it possible to isolate the magnetic disk from the driving section such as the VCM, via the isolation wall parallel to the recording surface of the magnetic disk, and at the same time to transmit driving force of the driving section to the head arm via the pivot shaft. The LUL scheme, which has not been adoptable in the conventional construction having isolation walls vertical to the recording surface of a magnetic disk, can be adopted for the above reason. The construction having a driving section positioned internally to an outer circumference of a magnetic disk can also be adopted. In short, flexible layout of components can be realized.

The above opening may take a circular shape, and the driving section may be a voice coil motor pivotally moving voice coils along the recording surface of the magnetic disk.

Providing a ramp adapted to hold the head after it has been unloaded from the recording surface of the magnetic disk allows the adoption of the LUL scheme, even for a disk drive with a magnetic disk isolated from a head arm driving section such as a VCM.

The construction according to the present invention also allows at least part of the driving section to be positioned internally to the outer circumference of the magnetic disk. This is because, unlike the conventional construction with isolation walls provided vertically to the recording surface of a magnetic disk, the construction according to the present invention does not cause interference between the isolation wall and the magnetic disk. The area of the installation surface for the magnetic disk drive can thus be reduced.

In addition, the magnetic disk drive may be adapted to position the pivot shaft externally to the outer circumference of the magnetic disk. Constructing the disk drive in this way prevents interference between the magnetic disk and the pivot shaft makes the head loadable to be positioned above the surface of the magnetic disk that does not face the isolation wall, and thus allows use of this surface as a recording surface.

The opening may take the shape that allows the head arm and the pivot shaft to penetrate the opening, and an associated section, except the circular opening that the pivot shaft is to penetrate, can be blocked with a sealing member. Constructing the disk drive in this way makes it possible, for example, after the head arm and the pivot shaft have been installed on the second compartment side, to insert the head arm from the above opening into the first compartment and assemble the arm. This allows the magnetic disk drive according to the present invention to be easily assembled.

Additionally, it is possible to arrange the magnetic disk and the driving section in independent enclosures and provide the above opening in an outer wall of the enclosure in which the magnetic disk is disposed.

Furthermore, it is possible to arrange the magnetic disk and the driving section in one enclosure and isolate the driving section from the magnetic disk via a cover which shrouds the driving section. Manufacturing processes equivalent to those of the conventional magnetic disk drive can be used by storing the magnetic disk and the VCM into one enclosure similarly to the conventional drive.

The above cover may have a notch, and the pivot shaft may be disposed in a penetrating form in the notch. Constructing the disk drive in this way makes it possible, for example, to install the cover easily, even after the head arm, the pivot shaft, and the driving section have been secured to an enclosure.

The isolation wall that isolates the voice coil motor is desirably formed of a soft magnetic material. This will prevent the magnetic disk from being magnetized by any leakage magnetic fluxes generated from the voice coil motor.

According to the present invention, it is possible to provide a magnetic disk drive whose flexibility in the layout of components is enhanced despite isolation between a magnetic disk and a driving section such as the voice coil motor that drives a head arm.

DETAILED DESCRIPTION OF THE INVENTION

Specific embodiments that apply the present invention will be described in detail below with reference to the drawings.

First Embodiment of the Invention

Figure 1:
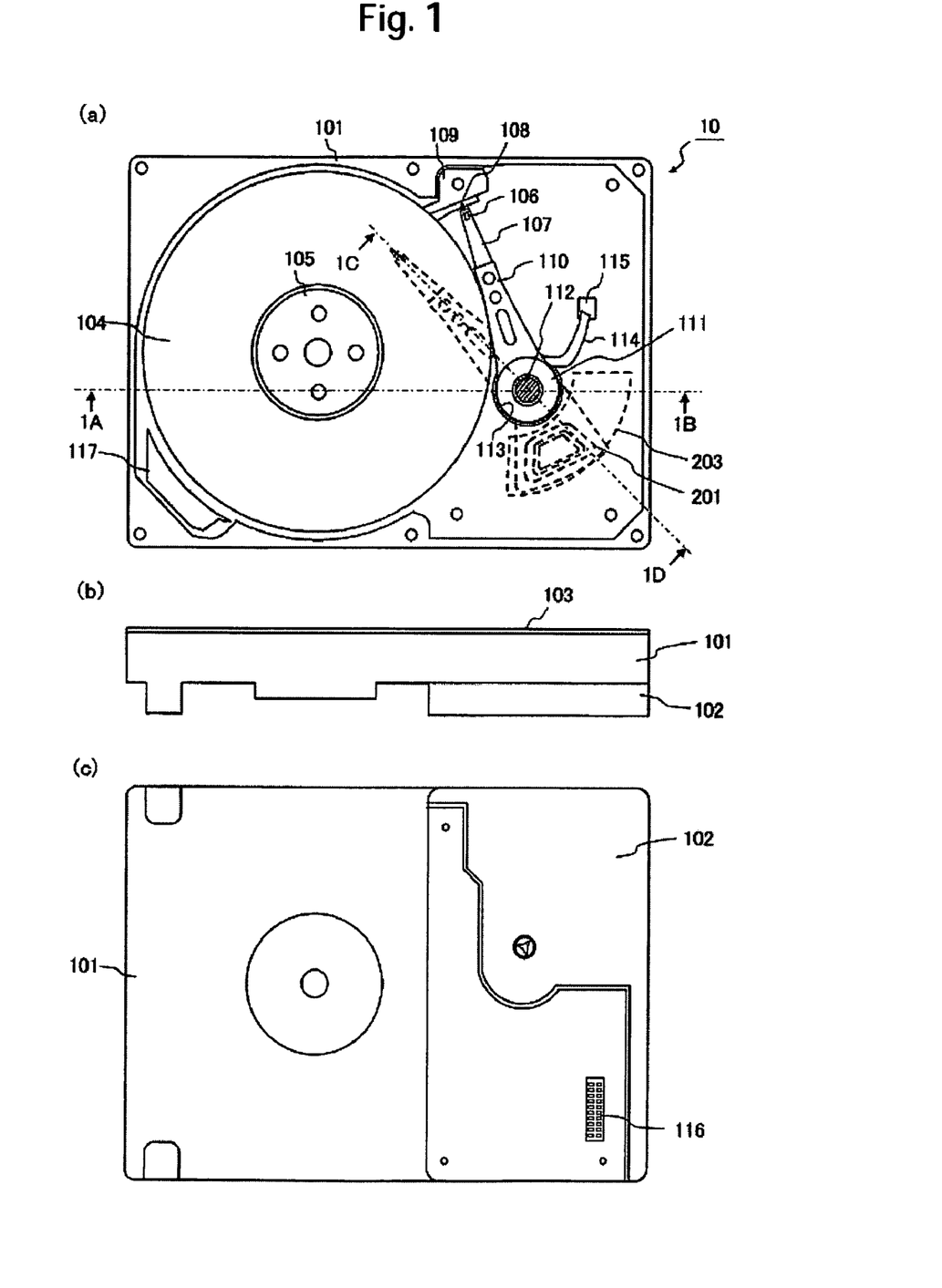
FIG. 1 shows various views of a magnetic disk drive according to an embodiment of the present invention.

A first embodiment of the present invention is an LUL type of magnetic disk drive to which the invention is applied. A general view of magnetic disk drive 10 according to the present embodiment is shown in FIG. 1. FIG. 1(a) is a front view of the magnetic disk drive 10 with a top cover 103 removed, FIG. 1(b) a side view of the magnetic disk drive 10, and FIG. 1(c) a bottom view thereof.

As shown in FIG. 1(b), the magnetic disk drive 10 is constructed so that a disk compartment enclosure 101 and a VCM compartment enclosure 102 are separated from each other and so that the VCM compartment enclosure 102 is secured to the bottom of the disk compartment enclosure 101. In this figure, a magnetic disk 104, a spindle motor (SPM) 105, a slider 106, a suspension 107, a head arm 110, and other elements are stored within the disk compartment enclosure 101. Also, components of a VCM 200, such as VCM coils 201 and a top yoke 203, are stored within the VCM compartment enclosure 102. That is to say, the bottom of the disk compartment enclosure 101 plays a role of an isolation wall which separates the magnetic disk 104 and the VCM components such as the VCM coils 201. As can be seen from this, the magnetic disk drive 10 is characterized in that the magnetic disk 104 and the VCM are isolated from each other by an isolation wall approximately parallel to a recording surface of the magnetic disk 4.

The components accommodated in the disk compartment enclosure 101 are described below referring to FIG. 1(a). The magnetic disk 104 is secured to a hub of the SPM 105. The SPM 105 rotates the magnetic disk 104 at a required speed. The SPM 105 is driven by a motor drive unit (MDU) provided outside the disk compartment enclosure 101. The MDU, together with other ICs such as a hard-disk controller (HDC), an MPU, and a read/write (R/W) channel, is mounted on a circuit board (not shown). The circuit board is provided in such a way as to form the bottoms of the disk compartment enclosure 101 and the VCM compartment enclosure 102.

A head (not shown) that writes data onto and reads it out from the magnetic disk 104 is provided at a front end of the slider 106. The slider 106 is fixed to the suspension 107, which is further fixed to the head arm 110. At a front end of the suspension 107 is provided a tab 108, which, by getting on a ramp 109, moves the slider 106 away from the magnetic disk 104.

The head arm 110 has a bearing 111 installed in the state where it can pivot about a pivot shaft 112. The bearing 111 of the head arm 110 and the pivot shaft 112 are arranged in a penetrating form in a circular opening 113 provided at the bottom of the disk compartment enclosure 101, and the head arm 110 is integrated with the VCM coils 201 accommodated in the VCM compartment enclosure 102. The pivot shaft 112 is fixed to the VCM compartment enclosure 103. In order to keep dust from flowing from the VCM compartment via the opening 113 into the disk compartment, a labyrinth seal that generates flow path resistance and suppresses the inflow of dust may be provided between the bearing 111 and the opening 113.

A cable, that connects the head located at the front end of the slider 106 and a head amplifier (not shown) that is provided in the VCM compartment enclosure 102, is provided as a flexible printed cable (FPC) 114. The FPC 114 has one end passed through an opening 115 within a lower face of the disk compartment enclosure 101 and connected to a connector inside the enclosure 101. The connector establishes connection to the circuit board on which are mounted the HDC, the R/W channel, the MDU, and other components. The head amplifier may be provided near the head arm, on the FPC 114. In this case, the FPC 114 will be a cable connecting the head amplifier and the R/W channel. The opening 115 is sealed to prevent dust from flowing in from the VCM compartment enclosure 102.

Finally, air filter 117 removes internal dust from the disk compartment enclosure 102 by utilizing the air stream generated by the rotation of the magnetic disk 104.

Figure 2:
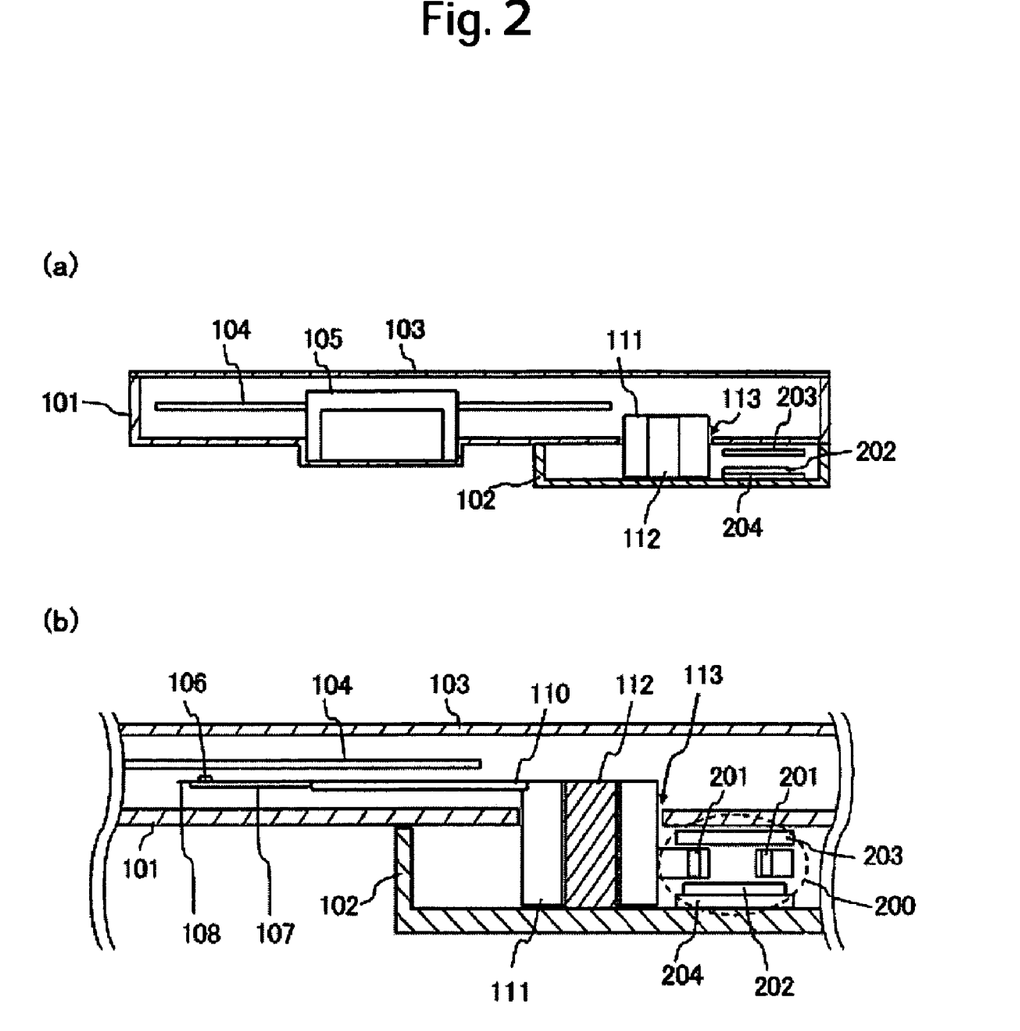
FIG. 2 shows sectional views of the magnetic disk drive of FIG. 1.

Next, the relationship in position between the magnetic disk 104 and VCM 200 that the magnetic disk drive 10 has will be described below using FIG. 2. FIG. 2(a) is a sectional view of the magnetic disk drive 10, taken along straight line 1A-1B in FIG. 1(a). FIG. 2(b) is a sectional view of the magnetic disk drive 10 existing when the slider 106 is positioned under the magnetic disk 104 by pivoting the head arm 110. The section taken along straight line 1C-1D in FIG. 1(a) is shown in this sectional view.

The VCM 200 is constituted by the VCM coils 201 fixed to the bearing 111 of the head arm 110, a magnet 202, a top yoke 203, and a bottom yoke 204. Supplying an electric current to the VCM coil 201 exerts a magnetic field of the magnet 202 upon the VCM coil 201, pivots the head arm 110 about the pivot shaft 112, and causes the head fixed to the slider 106 to be loaded for positioning above the surface of the magnetic disk 104.

As shown, the VCM 200 and the magnetic disk 104 are isolated from each other by the bottom of the disk compartment enclosure 101. The bearing 111 of the head arm 110 is disposed in a penetrating form in the opening 113 provided at the bottom of the disk compartment enclosure 101. The VCM coil 201 is installed on the VCM compartment side, which is an underside of the bearing 111, and the suspension 107 is fixed to the disk compartment side, which is an upper side of the bearing 111.

Such a construction makes it possible to transmit driving force of the VCM 200 to the head arm 110 in spite of the magnetic disk 104 and the VCM 200 being isolated from each other by the isolation wall parallel to the recording surface of the magnetic disk 104.

Figure 3:
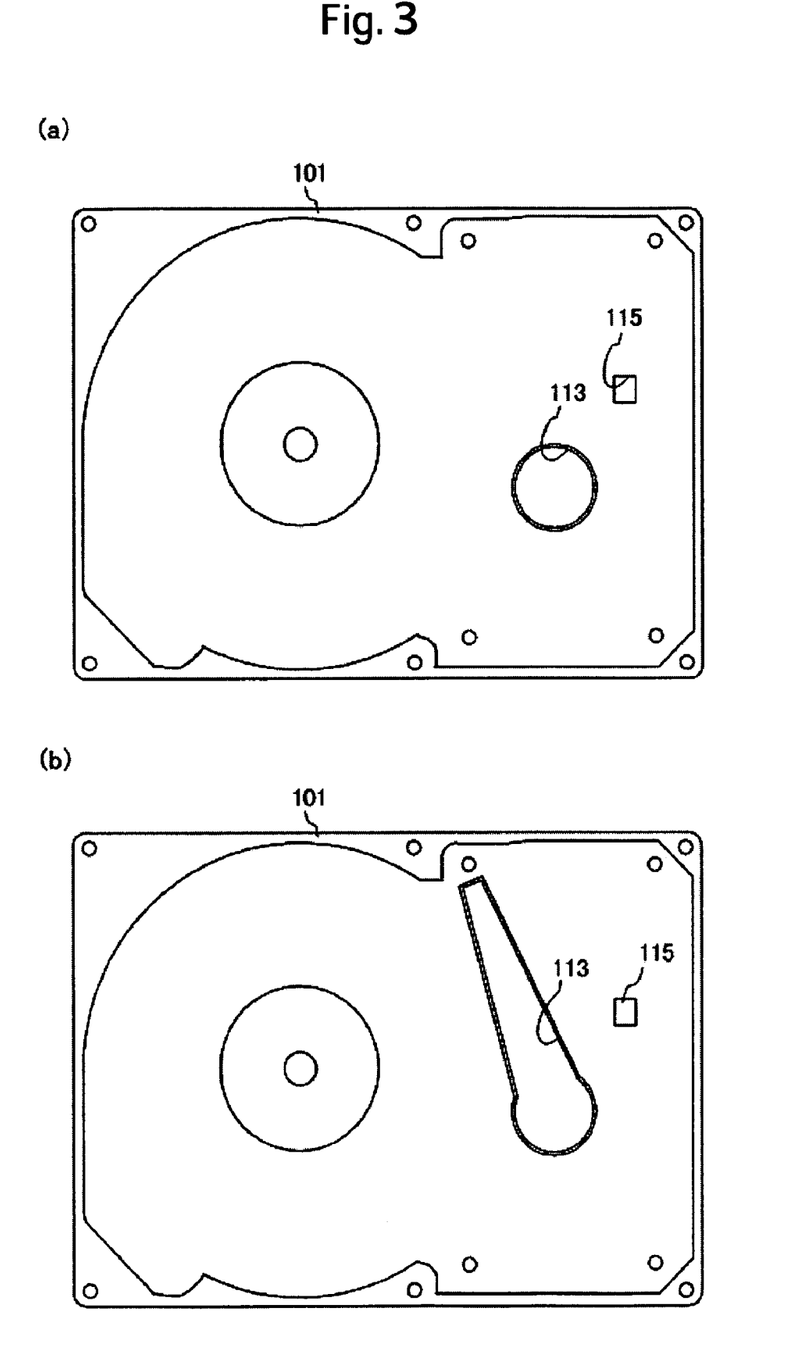
FIG. 3 includes views showing an enclosure of the magnetic disk drive of FIG. 1.

FIG. 3 is a view in which the components shown in the plan view of FIG. 1(a), such as the magnetic disk 104 and the head arm 104, are omitted to show the openings 113 and 115 provided at the bottom of the disk compartment enclosure 101. FIG. 3 is therefore a view equivalent to a plan view of the disk compartment enclosure 101 existing before it is assembled. As shown in FIG. 3(a), the opening 113 has a circular shape so that the head arm 110 can pivot about the pivot shaft 112. There are no limitations on a shape of the opening 115.

FIG. 3(b) shows the opening 113 whose shape is changed for easier assembly of the magnetic disk drive 10. Providing an opening of this shape allows the magnetic disk drive 10 to be easily assembled after a rear end of the head arm 110 integrated with the VCM coils 201 has been installed on the pivot shaft 112 fixed to the VCM compartment enclosure 103. The section of the opening 113 that is expanded to allow the suspension 107, the head arm 110, and other components to be passed through, can be sealed with a sealing material.

As described above, the magnetic disk 104 and the VCM 200 are isolated from each other by an isolation wall approximately parallel to the recording surface of the magnetic disk 104, and the head arm 110 is actuated about the pivot shaft 112 that penetrates the circular opening 113 provided in the isolation wall. This construction allows the adoption of the LUL scheme that has traditionally not been adoptable in the construction having an isolation wall(s) vertical to the recording surface of the magnetic disk 104, as in the conventional magnetic disk drive 50. As will be detailed in the later-described second embodiment of the present invention, it is also possible to adopt a construction having the VCM 200 positioned internally to the outer circumference of the magnetic disk 104.

The conventional magnetic disk drive 50 is of the construction in which the VCM 504 and the magnetic disk 505 are isolated by the upstream isolation wall 507 and downstream isolation wall 508 provided vertically to the recording surface of the magnetic disk 505, and by the arm pivot shaft 503. In this construction, therefore, the air stream parallel to the magnetic disk recording surface, generated by the rotation of the magnetic disk 505, has easily flown into the clearances between the upstream isolation wall 507 and the arm pivot shaft 503 and between the downstream isolation wall 508 and the arm pivot shaft 503.

In contrast to the above, the magnetic disk drive 10 is constructed so that it has the opening 113 in an isolation wall approximately parallel to the recording surface of the magnetic disk 104. Therefore, a direction of flow of the air stream generated by the rotation of the magnetic disk 104 and the isolation wall are maintained in a parallel relationship, which prevents the air stream from easily flowing into the opening 113. For this reason, the magnetic disk drive 10, compared with the conventional magnetic disk drive 50, can enhance the magnetic disk compartment and the disk compartment in separability, thus further reducing the flow of dust from the VCM compartment into the magnetic disk compartment.

While, as shown in FIG. 2(b), the magnetic disk drive 10 of the present embodiment is adapted to use a lower face of the magnetic disk 104 as the recording surface, the disk drive 10 can also be constructed so that the head is loaded for positioning at an upper face of the magnetic disk 104. In addition, as is traditionally conducted, both the upper and lower faces of the magnetic disk 104 can be used as recording surfaces by taking a stacked arrangement of head arms 110. It goes without saying that the present invention can be applied even in a construction having a stacked arrangement of even more head arms 110 and a plurality of magnetic disks 104.

Second Embodiment of the Invention

Figure 4:
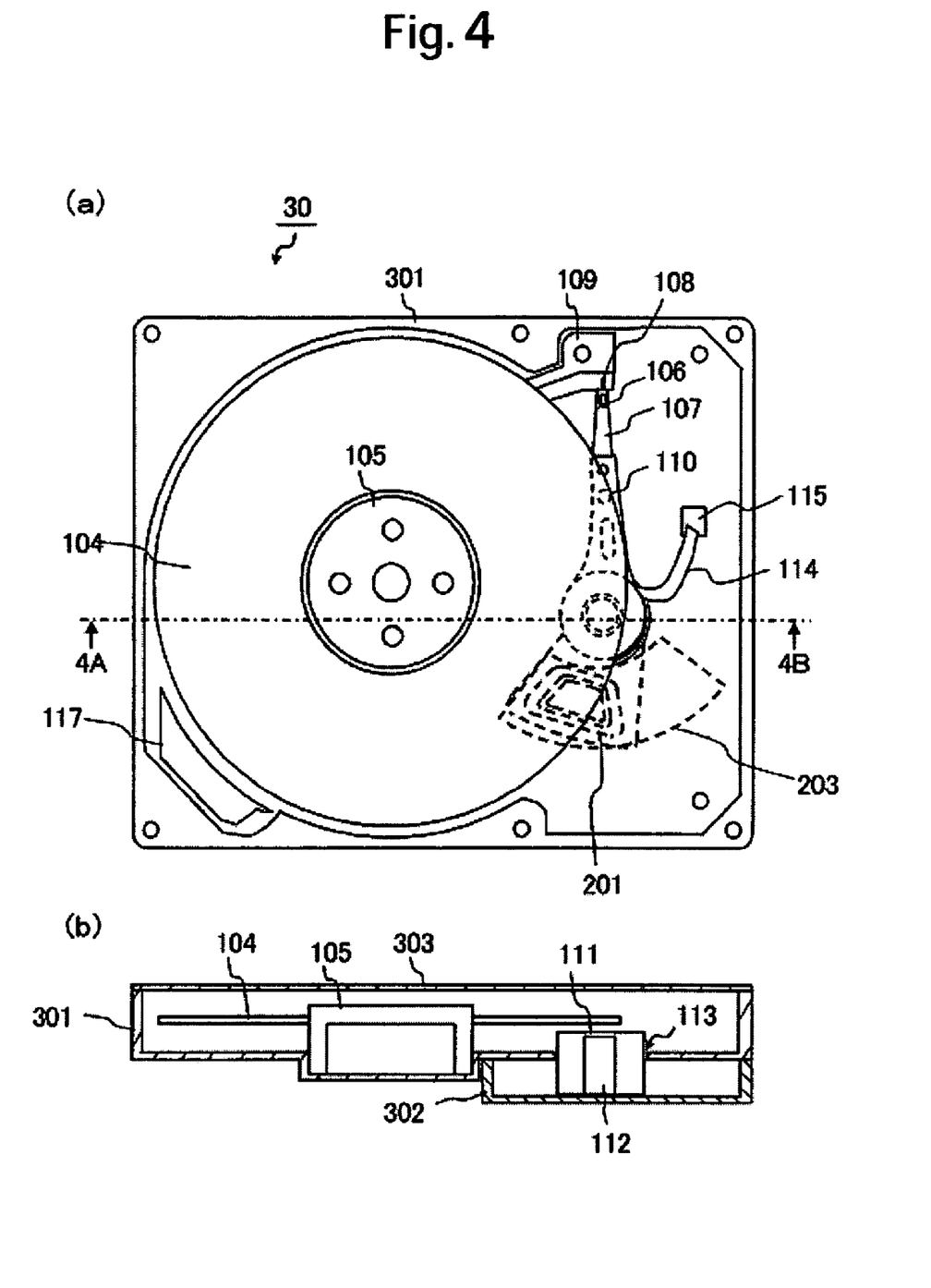
FIG. 4 shows views of another magnetic disk drive according to an embodiment of the present invention.

A general view of a magnetic disk drive 30 according to the present embodiment is shown in FIG. 4. FIG. 4(a) is a front view of the magnetic disk drive 30 with a top cover 303 removed, and FIG. 4(b) is a sectional view of the magnetic disk drive 30, taken along straight line 4A-4B in FIG. 4(a). The components that the magnetic disk drive 30 has are the same as those of the magnetic disk drive 10 according to the first embodiment of the present invention. Therefore, the same reference numeral is assigned to the same component and a description thereof is omitted hereunder.

The magnetic disk drive 30 is featured by the fact that a pivot shaft 112 and a VCM 200 are installed more internally to an outer circumference of a magnetic disk 104 than in the magnetic disk drive 10 according to the first embodiment of the present invention. Such a construction has not been adoptable in the construction having an isolation wall(s) vertical to a recording surface of a magnetic disk 104, as in the conventional magnetic disk drive 50. The adoption of such a construction, however, has become possible by isolating the magnetic disk 104 from the VCM 200 via an isolation wall approximately parallel to the recording surface of the magnetic disk 104. The adoption of such a construction allows reduction in the installation surface area required for installation of the magnetic disk drive 30.

Third Embodiment of the Invention

Figure 5:
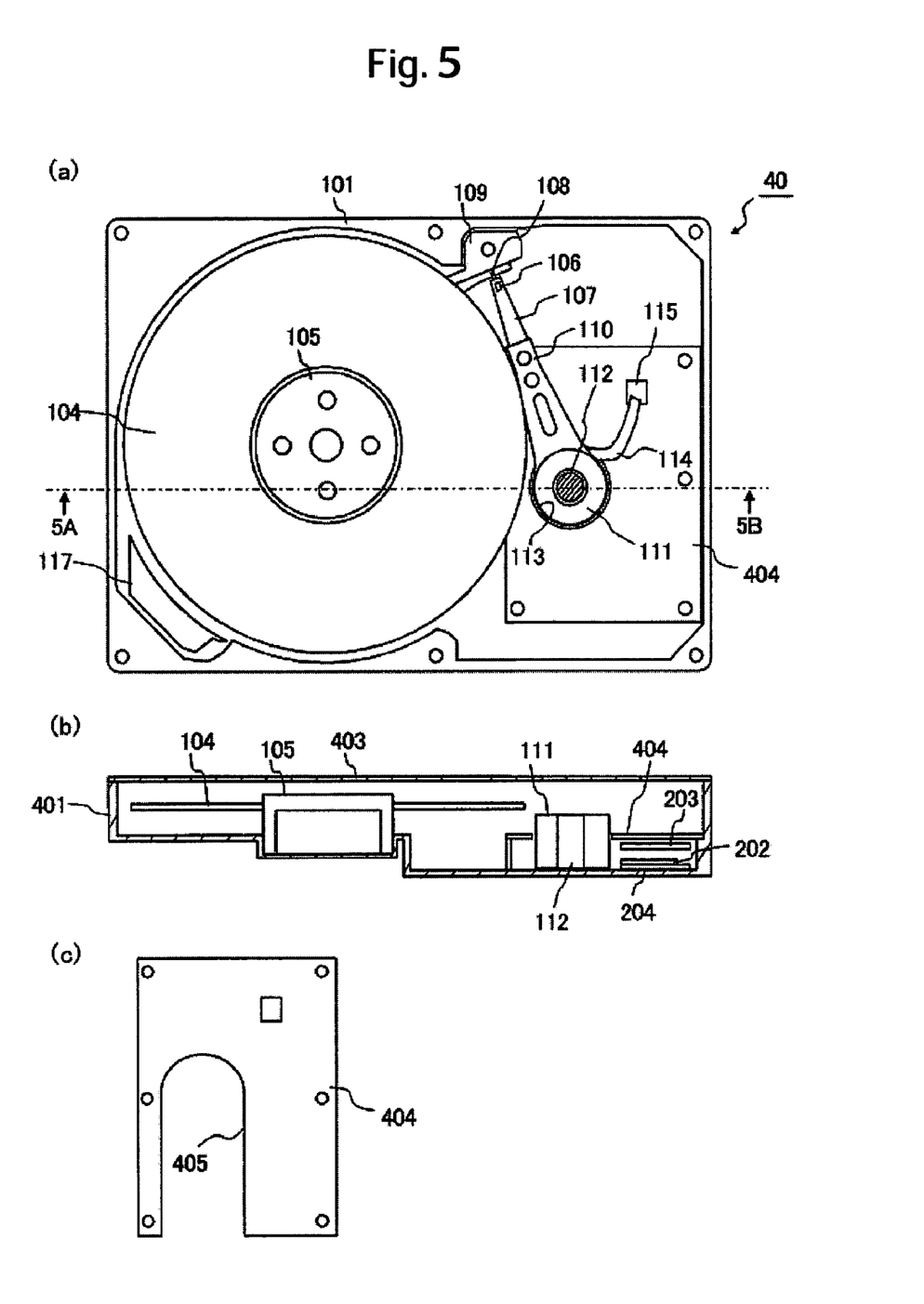
FIG. 5 shows views of yet another magnetic disk drive according to an embodiment of the present invention.

A general view of a magnetic disk drive 40 according to the present embodiment is shown in FIG. 5. FIG. 5(a) is a front view of the magnetic disk drive 40 with a top cover 403 removed, and FIG. 5(b) is a sectional view of the magnetic disk drive 40, taken along straight line 5A-5B in FIG. 5(a). The components that the magnetic disk drive 40 has are the same as those of the magnetic disk drive 10 according to the first embodiment of the present invention. Therefore, the same reference numeral is assigned to the same component and a description thereof is omitted hereunder.

The magnetic disk drive 40 differs from the magnetic disk drive 10 in that a disk compartment and a VCM compartment use a single common enclosure 401. In the magnetic disk drive 40, an installation location for a VCM 200 is shrouded with an isolation wall 404 in order to form the VCM compartment and isolate the VCM 200 from a magnetic disk 104.

To fix the isolation wall 404 to the enclosure 401 in the state where a head arm 110 is fixed to the enclosure 404, it is preferable that as shown in FIG. 5(c), a notch 405 be provided in the isolation wall 404. In this case, the entire notch 405, except the region needed to form an opening 113, is also preferably sealed with a sealing material after, with a pivot shaft 112 inserted into the notch 405, the isolation wall 404 has been fixed to the enclosure 401. In addition, the isolation wall 404 is preferably constructed of a soft magnetic material, for this will prevent a magnetic disk 104 from being magnetized by any leakage magnetic fluxes generated from a VCM.

As described above, the magnetic disk drive 40 is adapted to contain both the magnetic disk and the VCM in one enclosure, as with the conventional magnetic disk drive. Therefore, the magnetic disk drive 40 is easy to manufacture, compared with the magnetic disk drives 10 and 30 in which the disk compartment and the VCM compartment are separated from each other.

While examples of applying the present invention to a magnetic disk drive which employs the LUL scheme have been described in the above first to third embodiments, the invention can also be applied to magnetic disk drives of a contact start-stop (CSS) scheme. In addition, the present invention is not limited only to the above embodiments and it is obvious that various changes can be made without departing from the scope thereof.

It is to be understood that the above description is intended to be illustrative and not restrictive. Many embodiments will be apparent to those of skill in the art upon reviewing the above description. The scope of the invention should, therefore, be determined not with reference to the above description, but instead should be determined with reference to the appended claims along with their full scope of equivalents.

What is claimed is:

1. A magnetic disk drive comprising:
a first compartment in which a magnetic disk, a head that conducts at least either of data reading and writing operations on said magnetic disk, and a head arm holding said head are disposed; and
a second compartment with an internally disposed driving section that pivotally moves said head arm about a pivot shaft;
wherein said driving section and said head arm are disposed on radially opposite sides of said pivot shaft,
wherein said first compartment and said second compartment are separated by an isolation wall provided generally parallel to a recording surface of said magnetic disk, and said pivot shaft is disposed in a penetrating form in an opening of the isolation wall.

2. The magnetic disk drive according to claim 1, wherein: the opening is of a circular shape; and
said driving section is a voice coil motor that pivots said head arm along the recording surface of said magnetic disk.

3. The magnetic disk drive according to claim 2, wherein the isolation wall is formed of a soft magnetic material.

4. The magnetic disk drive according to claim 1, further comprising a ramp adapted to hold said head thereon after said head has been unloaded from the recording surface of said magnetic disk.

5. The magnetic disk drive according to claim 1, wherein at least part of said driving section is positioned internally with respect to an outer circumference of said magnetic disk.

6. The magnetic disk drive according to claim 1, wherein said pivot shaft is positioned externally to an outer circumference of said magnetic disk.

7. The magnetic disk drive according to claim 1, wherein:
said magnetic disk and said driving section are arranged in one enclosure; and
said driving section is isolated from said magnetic disk by a cover which shrouds said driving section.

8. The magnetic disk drive according to claim 7, wherein:
said cover has a notch; and
said pivot shaft is disposed in a penetrating form in the notch.

9. The magnetic disk drive according to claim 1, wherein the head arm includes a bearing which is disposed in a penetrating form in the opening of the isolation wall.

10. The magnetic disk drive according to claim 9, wherein the driving section is a voice coil motor that pivots the head arm along the recording surface of the magnetic disk, the voice coil motor including a voice coil installed in the second compartment.

11. A magnetic disk drive comprising:
a first compartment in which a magnetic disk, a head that conducts at least either of data reading and writing operations on said magnetic disk, and a head arm holding said head are disposed; and
a second compartment with an internally disposed driving section that pivotally moves said head arm about a pivot shaft;
wherein said first compartment and said second compartment are separated by an isolation wall provided generally parallel to a recording surface of said magnetic disk, and said pivot shaft is disposed in a penetrating form in an opening of the isolation wall,
wherein the opening has a shape that allows said head arm to pass through the opening during assembly, and the pivot to remain penetrating the opening after assembly with the opening being sealed with a sealing material.

12. The magnetic disk drive according to claim 1, wherein:
said magnetic disk and said driving section are each disposed in an independent enclosure; and
the opening is provided in an outer wall of the enclosure in which said magnetic disk is disposed.

13. A magnetic disk drive comprising:
a first compartment in which a magnetic disk, a head that conducts at least either of data reading and writing operations on the magnetic disk, and a head arm holding the head are disposed;
a second compartment;
driving means, disposed in the second compartment for pivotally moving the head arm about a pivot shaft; and
a isolation wall separating the first compartment and the second compartment, the isolation wall being generally parallel to a recording surface of the magnetic disk, and the pivot shaft is disposed through an opening of the isolation wall,
wherein the driving means and the head arm are disposed on radially opposite sides of the pivot shaft.

14. The magnetic disk drive according to claim 13, further comprising a ramp adapted to hold the head thereon after the head has been unloaded from the recording surface of the magnetic disk.

15. The magnetic disk drive according to claim 13, wherein at least part of the driving means is positioned inwardly with respect to an outer circumference of the magnetic disk.

16. The magnetic disk drive according to claim 13, wherein the pivot shaft is positioned externally to an outer circumference of the magnetic disk.

17. The magnetic disk drive according to claim 13, wherein:
 the magnetic disk and the driving means are each disposed in an independent enclosure; and
 the opening is provided in an outer wall of the enclosure in which the magnetic disk is disposed.

18. The magnetic disk drive according to claim 13, wherein:
 the magnetic disk and the driving means are arranged in one enclosure; and
 the driving means is isolated from the magnetic disk by a cover which shrouds the driving means.

19. The magnetic disk drive according to claim 18, wherein:
 the cover has a notch; and
 the pivot shaft is disposed in a penetrating form in the notch.

20. The magnetic disk drive according to claim 13, wherein the isolation wall is formed of a soft magnetic material.

* * * * *